United States Patent [19]

O'Brien et al.

[11] Patent Number: 4,915,771
[45] Date of Patent: Apr. 10, 1990

[54] SEGMENTED TAPE SHOE

[75] Inventors: Kevin D. O'Brien, Des Moines; Elmer R. Hulstrom, Sumner, both of Wash.

[73] Assignee: The Boeing Company, Seattle, Wash.

[21] Appl. No.: 106,724

[22] Filed: Oct. 8, 1987

[51] Int. Cl.$^4$ ............................................. B32B 31/00
[52] U.S. Cl. ....................................... 156/574; 156/577
[58] Field of Search ................. 156/574, 577, 391, 468, 156/475, 486

[56] References Cited

U.S. PATENT DOCUMENTS

| | | | |
|---|---|---|---|
| 4,292,108 | 9/1981 | Weiss | 156/259 |
| 4,461,669 | 7/1984 | Dontscheff. | |
| 4,601,775 | 7/1986 | Grone | 156/574 |
| 4,627,886 | 12/1986 | Grone et al. . | |
| 4,696,707 | 9/1987 | Lewis | 156/574 |
| 4,701,240 | 10/1987 | Kraemer | 156/555 |
| 4,750,965 | 6/1988 | Pippel | 156/574 |

Primary Examiner—George F. Lesmes
Assistant Examiner—J. Davis
Attorney, Agent, or Firm—Seed & Berry

[57] ABSTRACT

A segmented tape shoe for pressing tape into place along a predetermined path on a contoured lay-down surface. The tape shoe includes a plurality of tape shoe segments independently held in a close widthwise array by a shoe body. Each of the tape shoe segments has a substantially uniform width and a longitudinal cross section that is transversely urgeable against the composite tape. In one embodiment, each of the tape shoe segments is independently urgeable by pneumatic pressure. In another embodiment, the tape shoe segments can have a resilient layer covered by a low-friction skin.

2 Claims, 2 Drawing Sheets

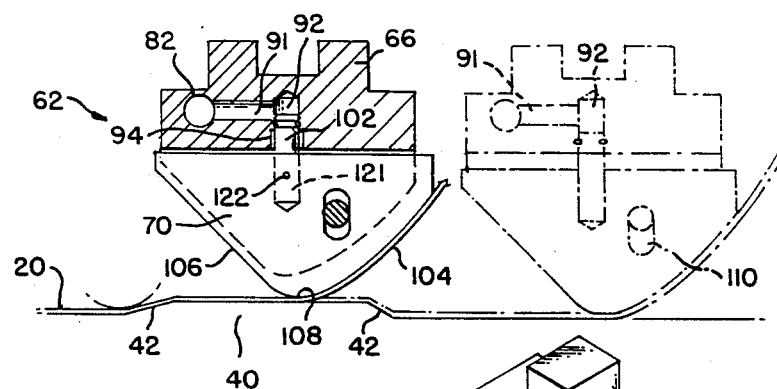
FIG. 2
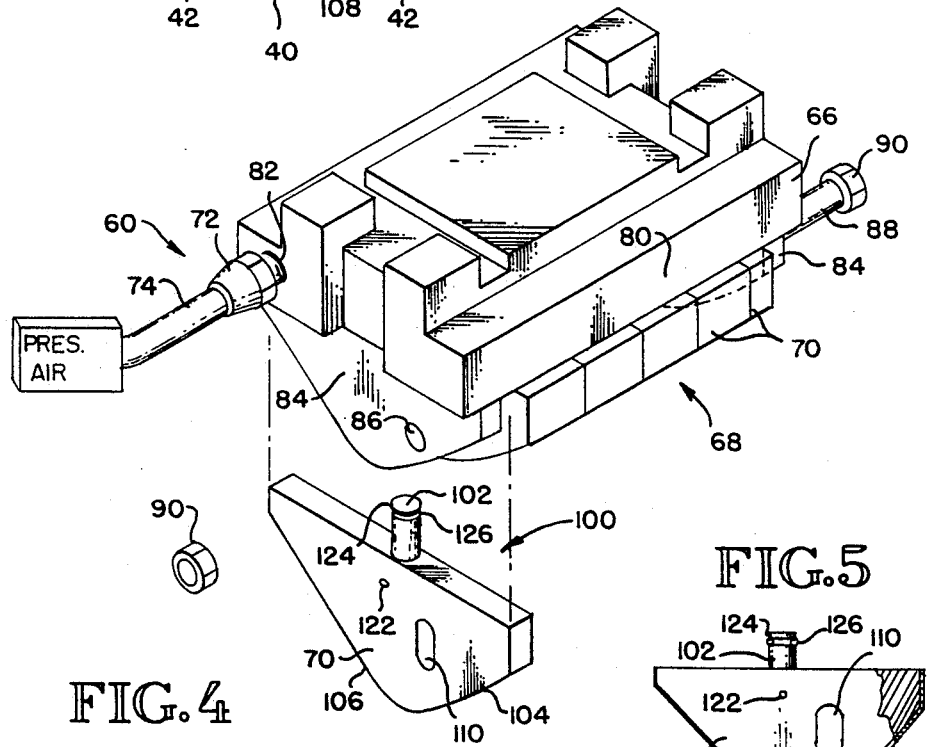
FIG. 3
FIG. 4
FIG. 5

SEGMENTED TAPE SHOE

DESCRIPTION

1. Technical Field

The invention relates generally to tape shoes for composite tape-laying machines which create laminate structures from plies of composite tape. More particularly, the invention relates to tape shoes that can be used to create composite structures having changing contours.

2. Background Art

Composite tape-laying machines are commonly used to create structures made from composite materials. The machines use a tape-laying head which compacts parallel rows of composite tape on a mold or lay-down surface. With each succeeding layer of composite layer, the direction of the rows can be changed to form laminations which give the resulting composite structure the desired strength characteristics. Flat surfaces can be produced by tape-laying machines at rates as high as 1800 inches per minute.

Modern composite tape-laying machines dispense tape strips on contoured surfaces in accordance with a numerical control program that causes the machine to follow a predetermined trajectory. A tape head supports both a supply reel of composite tape and a take-up reel for the backing paper removed from the composite tape as the tape is dispensed and compacted to the lay-down surface. The composite tape passes under a tape shoe which presses against the backing paper to force the composite tape into place on the surface. The backing paper is then stripped away from the composite tape and accumulated in the take-up reel. Tape heads of modern composite tape-laying machines can swivel the tape shoes in order to account for the changing contours of the lay-down surface.

There are three fundamental forms of tape shoe presently available for use in composite tape-laying machines. These are a rigid shoe, a roller shoe, and a ball-jointed shoe. The rigid shoe has a straight line contact with the contoured surface being formed. This results in composite tape "bridging" at those points where the surface contour cannot be followed by the line contact. In order to reduce the occurrence of "bridging," composite tape-laying machines operate at much reduced speeds (e.g., as slow as 500 inches per minute).

Roller tape shoes, which roll the composite tape onto the lay-up surface, also have a straight line contact and further generate a "wave" in the already laid down tape plies ahead of the tape shoe contact. Beside the bridging problems mentioned above, the wave created by the roller tape shoe also undesirably affects the compactness of the resulting composite structure.

The ball joint tape shoe, as exemplified in U.S. Pat. No. 4,601,775, has difficulty maintaining the alignment between the composite tape and the tape shoe. In particular, the tape tends to slip transversely with respect to the tape shoe and the resulting improper tracking produces gaps and/or overlaps between the parallel rows of laid composite tape. In addition, the compacting force produced by the ball joint tape shoe varies across the shoe, leading to nonuniform compaction of the composite materials. These problems result in a composite structure with reduced strength and an uneven surface.

DISCLOSURE OF THE INVENTION

It is an object of the present invention to provide a tape shoe capable of following contours in a composite structure without creating tape bridges.

It is another object of the present invention to provide a tape shoe that promotes better composite tape tracking in order to reduce any overlaps between parallel rows.

It is a further object of the present invention to provide a tape shoe that generates a substantially constant pressing force across the face of the shoe.

In accordance with the above objects, the present invention provides a segmented tape shoe for pressing a tape into place along a predetermined path on a contoured lay-down surface. The segmented tape shoe comprises a shoe body for holding a plurality of tape shoe segments, a plurality of tape shoe segments, and bias means for separately urging each of the tape shoe segments downwardly from the shoe body. The shoe body holds the plurality of tape shoe segments against the lay-down surface in a close widthwise array that is transverse to the trajectory. Each tape shoe segment has a substantially uniform width and a predetermined longitudinal cross section that is transversely urgeable against the tape.

In another aspect, the present invention provides a composite tape-laying machine for creating laminate structures on a lay-down surface from plies of a composite tape. The machine comprises a supply reel of composite tape covered by a backing paper, a tape-laying head for receiving the composite tape from the supply reel, a take-up reel for receiving the backing tape after it has been removed from the composite tape. It also comprises a mounting structure for supporting the supply reel, the tape-laying head, and the take-up reel in fixed relative positions. The tape-laying head includes a shoe body for holding each of a plurality of tape shoe segments against the lay-down surface in a close widthwise array that is transverse to the trajectory, and a plurality of tape shoe segments. Each tape shoe segment has a substantially constant width, the portions of the cross sections of the tape shoe segments that are held against the lay-down surface being identical. The tape-laying head also includes bias means for separately urging each of the tape shoe segments downwardly from the shoe body and against the composite tape.

In yet another aspect, the present invention provides a tape shoe segment for use in a segmented tape shoe for pressing a tape into place along a predetermined trajectory on a contoured lay-down surface. The tape shoe segment fits into a shoe body of the segmented tape shoe. The tape shoe segment comprises a block of hard material having a substantially uniform width, the portion of the cross section perpendicular to the width that is held against the lay-down surface transversely to the trajectory being predetermined. The tape shoe segment further comprises a guide pin attached to a face of the block of hard material opposite to the portion of the cross section that is held against the lay-down surface. The guide pin engages with the tape shoe to hold the tape shoe segment in position with respect to the tape shoe.

BRIEF DESCRIPTION OF THE DRAWINGS

FIG. 2 is a cross-sectional view of a variable contour in a composite lay-down structure.

FIG. 3 is a closeup view of a segmented tape shoe mounted in a composite tape-laying machine.

FIG. 4 is an exploded isometric view of a first embodiment of a tape shoe segment of the present invention.

FIG. 5 is an elevational view of a second embodiment of a tape shoe segment of the present invention.

BEST MODE FOR CARRYING OUT THE INVENTION

Figure 1:
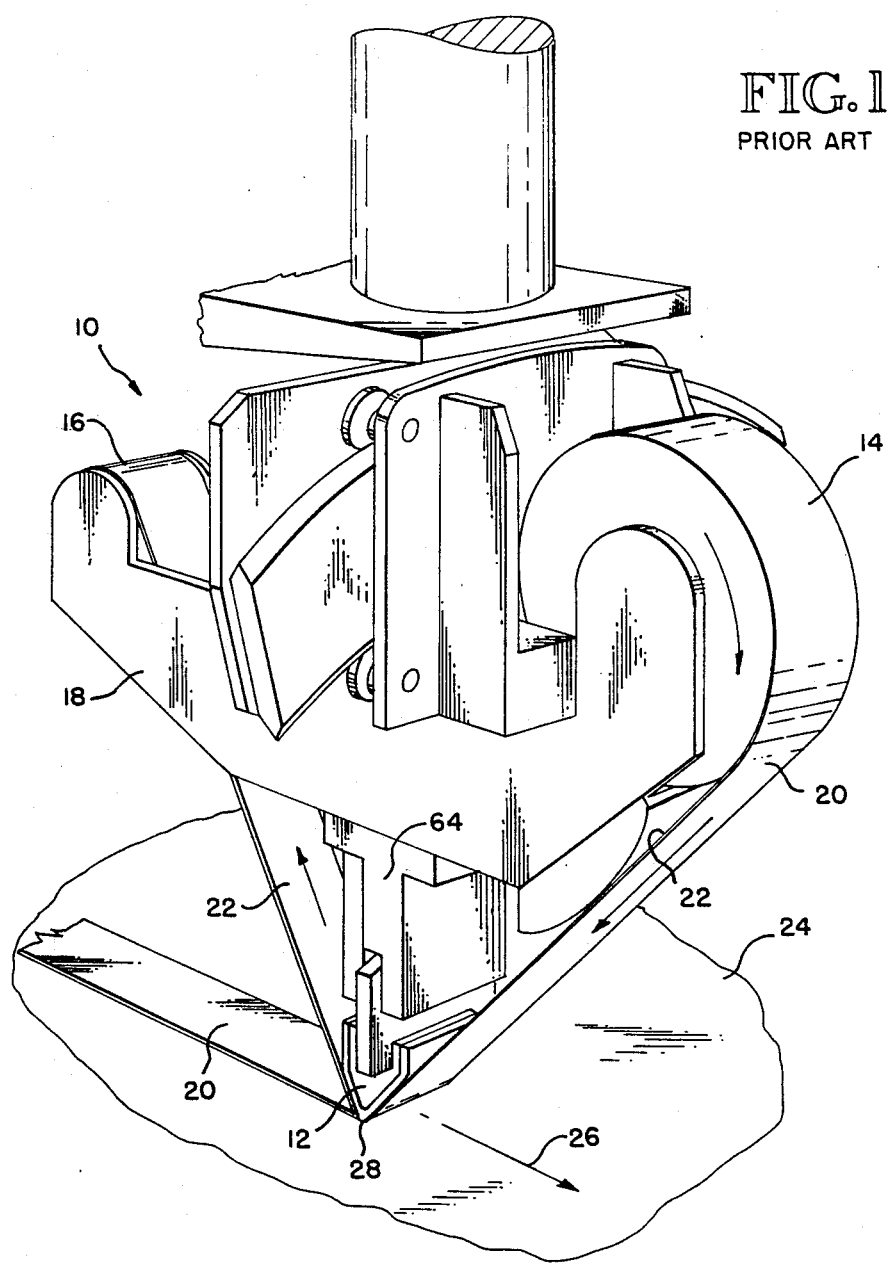
FIG. 1 is an isometric view of the tape head of a composite tape-laying machine known in the prior art, the machine being equipped with a rigid tape shoe.

Referring to FIG. 1, a prior art composite tape-laying machine includes a tape-laying head 10, including a rigid tape shoe 12, a composite tape supply reel 14, and a backing paper take-up reel 16. In a typical composite tape-laying machine of the prior art, the tape shoe 12, the supply reel 14, and the take-up reel 16 are each attached to a common mounting structure 18 which causes them to maintain fixed relative positions. In other prior art composite tape-laying machines, the tape shoe, the supply reel 14, and the take-up reel 16 can undergo various relative movements. The composite tape 20 is dispensed from the supply reel 14 with its backing paper 22 attached. The composite tape can be made from, for example, graphite fibers that are preimpregnated with an uncured thermosetting epoxy resin.

The composite tape 20 and the backing paper 22 are led under the rigid tape shoe 12, which forces the composite tape 20 against the composite lay-down surface 24.

The tape-laying head 10 follows a predetermined trajectory 26 and forces the tape shoe 12 transversely against the composite lay-down surface 24 along line contact 28. After the composite tape 20 has been laid by the rigid tape shoe 12, the backing paper 22 is stripped away and accumulated in the take-up reel 16.

FIG. 2 is a cross-sectional view of a variable contour in a composite lay-down structure. The lay-down structure 40 contains a number of overlapping plies made from the composite tape 20. Each ply is composed of a number of abutting parallel rows of the composite tape. The orientation of the rows in the various plies can be angularly displaced in order to create the desired strength characteristics of the lay-down structure 40. Many lay-down structures known in the prior art are nonuniform, having contours 42 by which the lay-down structure 40 can be made nonuniformly thick and/or nonplanar.

A prior art tape shoe, such as the rigid tape shoe 12 of FIG. 1 or a roller shoe, having a line contact, will be unable to compact the composite tape 20 against the contour 42, except under very special conditions. Those conditions are that the contour 42 is at least as wide as the tape shoe, is perpendicular to the trajectory of the tape shoe, and has a radius of curvature in the vertical plane that is not less than the radius of curvature of the tape shoe at the line contact (see line contact 28 in FIG. 1). Accordingly, when a tape shoe approaches a contour 42, one portion of the tape shoe will generally contact the contour 42 first and the entire tape shoe will be forced to follow the vertical deflections forced by that portion of the line contact of the tape shoe that is touching the contour 42. As a result, only those portions of the composite tape that are compacted into place by portions of the tape shoe that are contacting the contour 42 will be compacted into place. All other portions will be uncompacted and will result in a bridging 44 (i.e., a rounding off) of the contour 42.

If the lay-down structure 40 in FIG. 2 is being created by a composite tape-laying machine equipped with a prior art ball joint shoe, or other shoes which provide nonuniform compacting pressure across the contact line, the tape laid over contour 42 will be nonuniformly compacted and, accordingly, will not faithfully reproduce the contour's shape.

Referring to FIGS. 3 and 4, the tape-laying head 60 includes a segmented tape shoe 62 attached to a shoe support structure 64 (shown in FIG. 1). Shoe support structure 64 is attached to mounting structure 18, as shown in the composite tape-laying machine of FIG. 1. In some embodiments, segmented tape shoe 62 can rotate in the vertical plane about the trajectory with respect to the shoe support structure 64.

Segmented tape shoe 62 consists of two parts: shoe body 66 and a plurality 68 of tape shoe segments 70. Each of the tape shoe segments 70 has a substantially uniform width, although it is not necessary for tape shoe segments to have the same width. The tape shoe segments 70 can be made from a hard, low-friction material, such as Ultraglide ®. Shoe body 66 is supplied with pressurized air through fitting 72 that attaches tubing 74 to the side of shoe body 66. Tubing 74 carries pressurized air from elsewhere on the composite tape-laying machine to the shoe body 66.

Tape shoe segments 70 are held together in a close widthwise array by shoe body 66 so that each tape shoe segment 70 can move transversely to the trajectory 26 and independently of the other tape shoe segments 70.

According to the structure just defined, therefore, when segmented tape shoe 62 approaches a contour 42 in the lay-down structure 40, each individual tape shoe segment is driven transversely to the trajectory in accordance with the local contour of the lay-down structure.

While the segmented tape shoe 62 of FIG. 3 is shown with six equal width tape shoe segments 70, one skilled in the art will appreciate that the number of tape shoe segments and their individual widths can be varied according to the radius of curvature of the contours that the segmented tape shoe 62 is expected to follow. In addition, since each tape shoe segment 70 is independent of the others, they can be urged independently (e.g., by individual springs or pneumatic pressure) against the lay-down structure 40.

The shoe body 66 can be made from a manifold plate 80 containing a port 82 for receiving the fitting 72. Two end plates 84 are mounted perpendicular to the underside of manifold plate 80. The end plates 84 each contain transversely aligned holes 86 (only one shown). Retaining rod 88 can extend through the hole 86 in one end plate 84 to the other hole 86 in the other end plate 84 and be held in this position by nuts 90 which attach to the threads of the retaining rod 88 extending through the transversely opposed holes 86.

Manifold plate 80 is machined to contain air pressure passages 91 that lead to shoe segment ports 92 (one for each tape shoe segment 70) on the underside of the manifold plate 80. The manifold in the manifold plate 80 thereby provides pneumatic pressure for the purpose of urging each individual tape shoe segment 70 against the composite tape 20.

Each segmented shoe assembly 100 consists of a tape shoe segment 70 and a guide pin 102. The tape shoe segment 70 has a leading surface 104 and a trailing surface 106. The contact line 108 where the tape shoe 70 presses against the composite tape 20 demarcates separation between the leading surface 104 and the trailing surface 106. The leading surface 104 can be given a relatively large radius of curvature (for example, 4.1 inches), the trailing surface 106 can be made planar, and the radius of curvature of the tape shoe segment 70 at the contact line 108 can be relatively small (for example, 0.5 inch). The radius of curvature of the tape shoe segment 70 at the contact line 108 determines the radius of curvature of the sharpest contour with which the tape shoe segment 70 can be used.

The guide pin 102 has a circular cross section which forms a tight fit with the brass bushing 94 in the shoe segment port 92. One end of the guide pin 102 is placed in a circular hole 121 in the upper face of the tape shoe segment 70. The guide pin 120 is retained in the hole 121 by roll pin 122. The hole 121 is located behind the center of the radius of curvature of the contact line 108 with respect to the direction that tape 20 moves past the tape shoe segment 70.

The guide pin 120 has a circumferential groove 124 which carries an O-ring 126. The O-ring 126 on the guide pin 120 substantially pneumatically seals the guide pin 120 and the shoe segment port 192. Each of the tape shoe segments 70 is assembled to the manifold plate 80 by forcing the guide pin 120 into a corresponding shoe segment port 92.

The plurality 68 of tape shoe segments 70 are retained in position in manifold plate 80 by retaining rod 88, which passes through the transversely aligned holes 86 and the end plates 84 and the elongated holes 110 in each of the tape shoe segments 70. Each elongated hole 110 has a transversely vertical dimension that allows its tape shoe segment 70 to move with respect to the manifold plate 80. The vertical movement exceeds the expected amount of vertical travel that the tape shoe segment 70 must make when laying the composite tape 20 on the composite lay-down surface 24.

In practice, it has been found that adjacent tape shoe segments 70 can be spaced by approximately 0.010 inch. In addition, it has been found that any tendency of the composite tape 20 to move transversely across the tape-laying head 10 is diminished by providing particularly thin tape shoe segments 70 at the two ends of the widthwise array of tape shoe segments.

FIG. 5 is a side elevational view of an alternative form of a tape shoe segment 70 for use in a second embodiment of the tape-laying head 60 of the present invention. A tape shoe segment 130 includes a carrier body 132 and a resilient layer 134. The carrier body 132 can be made from a relatively hard material, including acetal resins such as Delrin ® or aluminum, while the resilient layer 134 can be made from an elastomeric material or rubber. The friction between the tape shoe segment 130 and the backing paper 22 of the composite tape 20 can be reduced further by forming a thin skin 136 over the resilient layer 134. The skin 136 can be formed from a low-friction material such as a sheet of a polyester film Mylar ®. The tape shoe segment 130 can be assembled with the manifold plate 80 in FIG. 4 to form a second embodiment of the segmented pneumatic tape shoe of the present invention.

In some instances, it may be desirable that the tape shoe segments be resiliently retained so that the pressing force increases as the tape shoe segments move toward the manifold plate 80. In this case, the segmented tape shoe will include springs to provide the force urging the tape shoe segment away from the manifold plate.

While two preferred embodiments of the present invention have been described in the foregoing, it will be appreciated by those skilled in the art that various modifications of this invention can be made without departing from its spirit and scope. Therefore, the spirit and scope of the invention are to be limited only by the following claims.

We claim:

1. A segmented tape shoe for pressing a tape into place along a predetermined trajectory on a contoured lay-down surface, comprising:
   a shoe body for holding each of a plurality of tape shoe segments against the lay-down surface in a close widthwise array that is transverse to the trajectory;
   a plurality of tape shoe segments, each having a substantially constant width, the portions of the cross sections of the tape shoe segments that are held against the lay-down surface being substantially identical, wherein the close widthwise array of the plurality of tape shoe segments has two end segments, the two end segments being thinner than at least one tape shoe segment contained internally within the widthwise array of tape shoe segments; and
   bias means for separately urging each of the tape shoe segments downwardly from the shoe body.

2. A segmented tape shoe for pressing a tape into place along a predetermined trajectory on a contoured lay-down surface, comprising:
   a shoe body for holding each of a plurality of tape shoe segments against the lay-down surface in a close widthwise array that is transverse to the trajectory and prevented from rotating with respect to the shoe body and has two end segments, the two end segments being thinner than at least one tape shoe segment contained internally within the widthwise array of tape shoe segments;
   a plurality of tape shoe segments, each having a substantially constant width, the portions of the cross sections of the tape shoe segments that are held against the lay-down surface being substantially identical; and
   bias means for separately urging each of the tape shoe segments downwardly from the shoe body.

* * * * *